Figure 1:
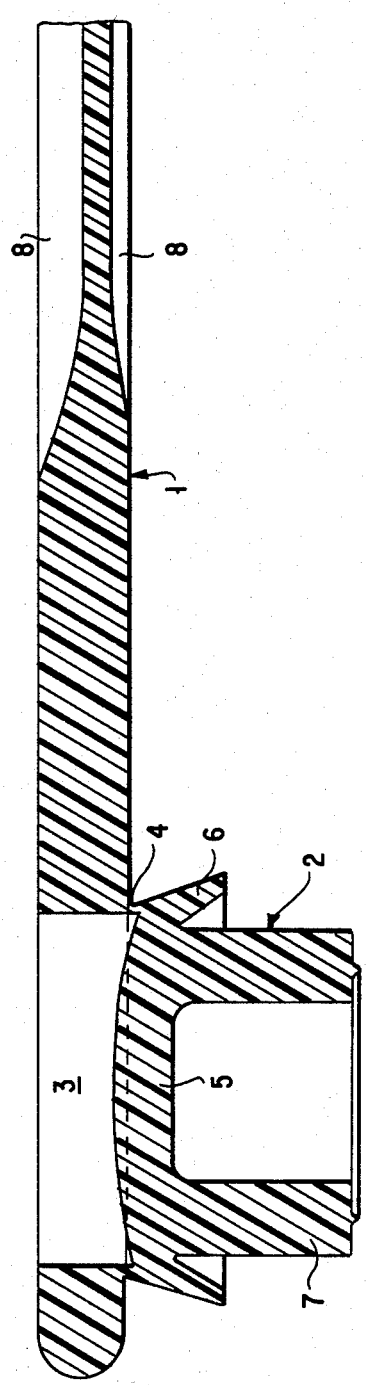

United States Patent [19]

Jorgensen

[11] Patent Number: 4,507,821
[45] Date of Patent: Apr. 2, 1985

[54] PLASTIC HANDLE ASSEMBLY

[75] Inventor: Helge D. Jørgensen, Copenhagen, Denmark

[73] Assignee: Superfos Emballage A/S, Vipperød, Denmark

[21] Appl. No.: 406,476

[22] Filed: Aug. 9, 1982

[30] Foreign Application Priority Data

Aug. 11, 1981 [DK] Denmark .............................. 3565/81

[51] Int. Cl.$^3$ .............................................. B65D 25/32
[52] U.S. Cl. ................................ 16/126; 16/DIG. 24; 16/DIG. 42
[58] Field of Search ...................... 16/111 R, 118, 113, 16/121, 122, DIG. 12, DIG. 18, DIG. 19, DIG. 24, DIG. 25, DIG. 40, DIG. 41, DIG. 42, 112, 123, 126; 29/414, 416; 403/2; 74/553, 557; 294/27 R, 31.2; 220/91, 94 R

[56] References Cited

U.S. PATENT DOCUMENTS

| | | | |
|---|---|---|---|
| 2,828,147 | 3/1958 | Peiffer | 403/2 X |
| 3,297,195 | 1/1967 | Hidding | 220/91 X |
| 3,340,762 | 9/1967 | Bennett | 403/2 X |
| 3,448,893 | 6/1969 | Jeanneau | 220/91 |
| 4,052,768 | 10/1977 | Yamazaki et al. | 16/121 |

FOREIGN PATENT DOCUMENTS 1586110 3/1981 United Kingdom ................. 220/91

Primary Examiner—Fred A. Silverberg
Attorney, Agent, or Firm—Pennie & Edmonds

[57] ABSTRACT

A handle (1) for use on a bucket of plastic material and a fastening knob (2) are integrally moulded and interconnected by a moulded fin (4). The fastening knob (2) has a head (5), an elastically resilient flange (6) slanting outwards, and a shank (7). When the handle is to be attached to a bucket, the free end of shank (7) is connected to the bucket wall, preferably by ultrasonic welding, and handle (1) is pressed towards the wall. Head (5) is pressed through an aperture (3) in the handle to pivotably mount the handle on the shank (7), with flange (6) acting as a barb-like anchoring member preventing the handle from falling off. Simultaneous moulding of the handle and the fastening knob renders the use of lateral core removing openings superfluous and simplifies mounting of the handle and the knob.

2 Claims, 4 Drawing Figures

U.S. Patent  Apr. 2, 1985  Sheet 1 of 2  4,507,821

PLASTIC HANDLE ASSEMBLY

The present invention relates to a handle for use on a bucket of plastic, specifically a cylindrical paint bucket and similar containers, and to a method of fastening the handle to the bucket.

Generally handles for use on sealable buckets are pivotally attached at two diametrically opposed sites on the bucket wall by means of pivots protruding inwardly from the ends of the handle, said pivots engaging ears moulded as an integral part of the bucket or welded thereto, or by means of pins protruding from the bucket wall, said pins engaging apertures formed in the handle ends. These measures, however, complicate the manufacture of the buckets to a substantial degree and the various protrusions constitute a hindrance when buckets are stapled or circulated in a filling station. The manufacture of plastic handles provided with fastening knobs increases moulding costs, since the mould has to be provided with laterally removable cores. Loose pins and loose fastening knobs to be fastened to the buckets as pivots for the handles are time consuming items and may cause difficulties during the fastening operation of the handle.

It is the object of the invention to overcome the disadvantages of the prior art handles and according to the invention this is achieved in that each handle end is provided with a fastening knob moulded integrally with the handle, one or several thin moulded fins connecting the peripheral edge of a through-going handle end aperture to the circumference of the head of the knob, the knob having such dimensions that its head can be pressed through said aperture, the side of the head facing away from the handle being provided with a shank and a barb-like member.

The handle and the fastening knob are moulded integrally, no lateral core removing mould openings being needed. The thin circumferential fin between the inlet or inlets for the handle and knob cavities of the mould or several, e.g. three, thin lugs formed at each individual cavity inlet will be ruptured when the fastening knob is to be attached to the bucket, preferably by means of ultrasonic welding, after the handle has been pressed over the skirt-like portion of the fastening knob, said portion preventing the handle from falling off. Mounting of the knob and the handle is thus readily performed in one single operational step.

The head of the fastening knob is easily provided with a peripheral resilient skirt-like flange extending downwards and outwards along the shank and constitutes a kind of barb or anchoring member. When the fastening knobs are pressed against the bucket wall the free ends of their shanks are attached to the wall in any known way, e.g. by means of ultrasonic welding or by means of glueing.

Figure 2:
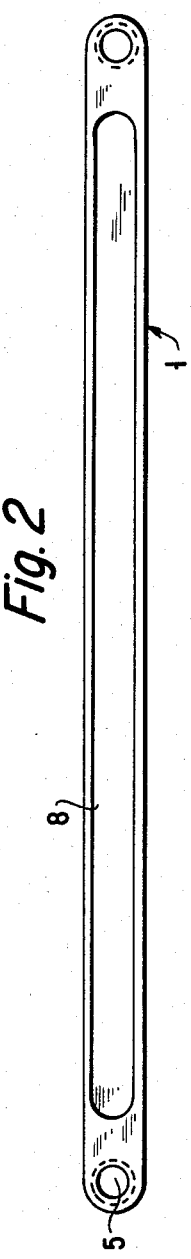
Figure 3:
Figure 4:
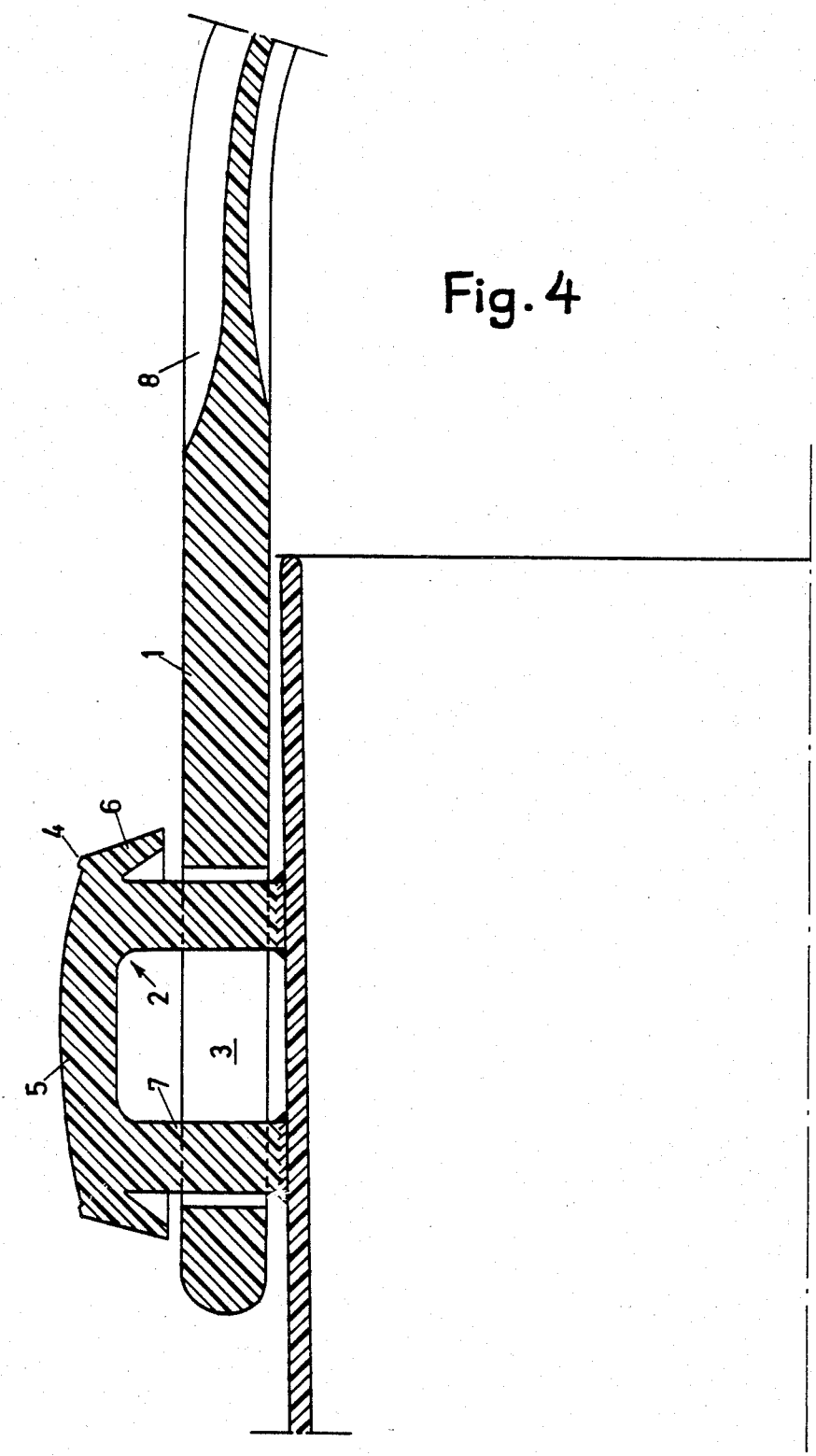

The invention will now be described in more detail, reference being had to the drawing, on which FIG. 1 is a longitudinal section of one end of a handle according to the invention, FIG. 2 is a top view of the handle, FIG. 3 is a longitudinal section of the handle, and FIG. 4 is a longitudinal section of one end of the handle rotatably secured to a bucket.

The drawing shows a straight handle 1 not yet mounted, the handle together with its pertaining fastening knobs 2 constituting an integrally moulded unit. At each of its ends handle 1 has a through-going aperture 3. At the inlet between the mould cavities of handle 1 and knob 2 a thin moulded fin 4 is present connecting the handle and the fastening knob, said fin being formed by the mould inlet between the handle cavity and the knob cavity during moulding of the handle. Fin 4 may also be in the form of several, e.g. three, fins 4 formed by a corresponding number of individual inlets to the moulding cavities.

Each fastening knob 2 has a head 5 with a peripheral outwardly slanting skirt-like flange 6, the outer diameter of said flange being slightly larger than the diameter of aperture 3. Knob 2 also has a shank 7. Between its ends handle 1 is provided with recesses 8 which increase the flexibility of the handle.

When handle 1 is to be attached to a container wall, e.g. a cylindrical paint bucket, it is bent in such a manner that shanks 7 of knobs 2 are moved towards two diametrically opposed sites on the bucket wall, where the free ends of the shanks 7 are fastened, preferably by means of ultrasonic welding. During the fastening operation or immediately after the handle is pressed further inwards towards the bucket wall, whereby the moulded fins 4 are disrupted and head 5 is pressed through aperture 3, the aperture thus encircling shank 7 which now acts as a pivot for the handle 1. Each shank is of smaller outside dimension that the adjacent aperture. The shanks act as a fixed pivot for rotatably mounting the handle member on the shanks. Flange or skirt 6 acting as a kind of barb or anchoring member prevents the handle from falling off.

It should be noted that the fastening knob may have many different forms beyond the one shown on the drawing. Head 5, flange 6 and shank 7 may have other axial and/or radial forms and flange 6 may be replaced by other types of barb-like anchoring means.

What I claim is:

1. A bucket handle comprising:
   (a) an elongated handle member having an aperture adjacent each end thereof; and
   (b) a pair of fastening knobs for attaching the handle member to a bucket, each fastening knob including
      (i) a shank axially aligned with an aperture for movement therethrough;
      (ii) breakable fin means connecting a first end of the shank to the handle member adjacent said aperture, and
      (iii) barb-like anchoring means attached to the shank adjacent the first end thereof, said anchoring means facing toward a second end of said shank and having a size larger than said aperture,
      (iv) the second end of each shank being free for attachment to said bucket, and
      (v) said barb being of elastically resilient construction to facilitate pressing said barb through said aperture with said shank after the second end of the shank has been connected to the bucket for securing the end of the handle member on the shank between the bucket and barb,
   the elongated handle member is constructed of molded plastic;
   the barbs are integrally molded to the handle member by way of said fin means;
   each shank is of smaller outside dimension than the adjacent aperture, said shank acting as a fixed pivot for rotatably mounting the handle member on the shank.

2. A bucket handle according to claim 1 wherein
   (a) each fastening knob is generally cup-shaped with a bottom wall of the cup shape defining a head at the first end of the shank at which the fin means are located.

* * * * *